E. T. REMISCH.
CONVERTIBLE TOOL.
APPLICATION FILED MAR. 7, 1910.
984,778.
Patented Feb. 21, 1911.
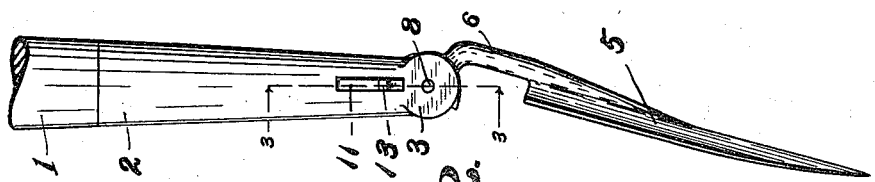
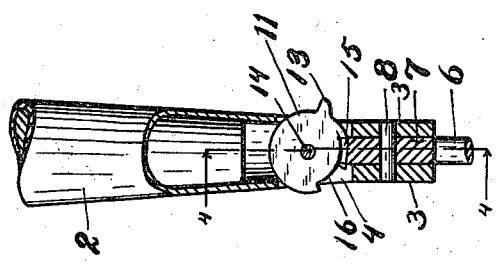
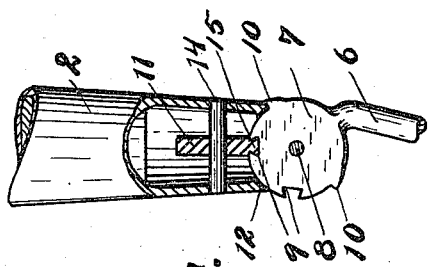
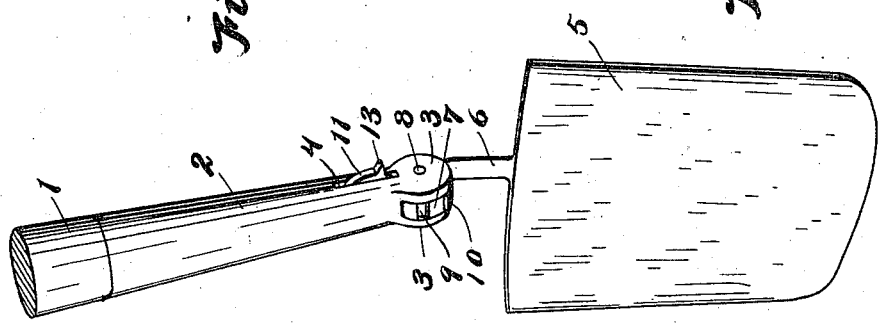
Witnesses
Inventor
Edward T. Remisch

UNITED STATES PATENT OFFICE.

EDWARD T. REMISCH, OF KALAMAZOO, MICHIGAN, ASSIGNOR OF ONE-FOURTH TO CLARENCE W. MARTIN AND ONE-FOURTH TO FRANK B. MONROE, SR., OF BATTLE CREEK, MICHIGAN.

CONVERTIBLE TOOL.

984,778. Specification of Letters Patent. Patented Feb. 21, 1911.

Application filed March 7, 1910. Serial No. 547,897.

*To all whom it may concern:*

Be it known that I, EDWARD T. REMISCH, citizen of the United States, residing at Kalamazoo, Michigan, have invented certain new and useful Improvements in Convertible Tools, of which the following is a specification.

This invention relates to improvements in convertible tools.

I have illustrated my improvements embodied in a tool adapted to be adjusted for use as a shovel or as a hoe. It will be obvious that my improvements are also capable of embodiment in other tools, such as in tined tools, thereby securing a convertible tool adapted for use as a fork, or as a potato hook or rake. The joint can be used wherever an adjustable joint is needed.

The main objects of this invention are to provide an improved convertible tool of the class described, which is simple in structure and readily adjusted, and, at the same time, one which is strong and rigid.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a perspective view of a structure embodying my improvements adjusted as a shovel. Fig. 2 is a side elevation thereof. Fig. 3 is a detail vertical section taken on a line corresponding to line 3—3 of Fig. 2, showing details of the adjusting mechanism. Fig. 4 is an enlarged detail taken on a line corresponding to line 4—4 of Fig. 3.

In the drawings, similar reference characters refer to similar parts throughout the several views, and the sectional views are taken looking in the direction of the little arrows at the ends of the section lines.

Referring to the drawing, 1 represents the handle provided with a shank ferrule 2, having a pair of pivot ears 3 at its lower end, and a slot 4 disposed transversely above the ears. The blade 5 is provided with a shank 6, having a disk-like head or member 7 thereon. This shank-member 7 is arranged between the ears 3 and pivotally secured thereto by means of the pivot 8. The shank member 7 is provided with peripheral notches 9, which are preferably dove-tailed, as illustrated. The shank member 7 is also provided with a pair of stops 10, which co-act with the catch 11 in adjustably supporting the blade, the stops 10 being adapted to rest or engage the handle at 12. The catch 11 is preferably disk-like in form, as illustrated, and is provided with a finger piece 13, the catch being arranged to project through the slot so that the edges of the slot serve to support the same against lateral movement on the pivot pin 14, so that substantially the only strain on the pin is that of pivotally supporting the catch. The engaging member 15 of the catch is dove-tail shape in cross section to engage the notches 9 in the shank member 7. The catch member is notched at 16, so that the shank member 7 can be freely swung on its pivot when the catch engaging member 15 is disengaged.

My improved adjustable or convertible tool is simple in structure, and, at the same time, can be readily adjusted and when adjusted, is strong and rigid. The improvement, it will be noted, relates to the adjustable joint more especially, and I desire to claim such joint broadly.

Having thus described my invention, what I claim as new and desire to secure by Letters Patent is:

1. The combination of a tool, a handle therefor having a pair of pivot ears at its lower end, and a slot disposed transversely above said ears; a disk-like shank member for said tool pivoted between said ears and having dove-tailed notches therein and handle engaging stops thereon; and a catch pivoted in said slot in said handle to be supported against lateral movement by the edges of said slot, said catch being provided with a dove-tailed engaging member to co-act with said notches in said shank head, said stops being adapted to co-act with said catch in supporting said tool in its adjusted position.

2. The combination of a tool, a handle therefor having pivot ears at its lower end, and a slot disposed transversely above said ears; a shank member for said tool pivoted between said ears and having dove-tailed notches therein; and a catch arranged in said slot in said handle, said catch being provided with a dove-tailed engaging member to coact with said notches in said shank-head.

3. A joint for combination tool or like purpose, consisting of one member provided with pivot ears, with a slot transversely therethrough, and a second member pivoted between the said ears and having transverse dovetail notches; and a catch arranged in the slot of said first member and supported thereby, provided with a dovetail engaging portion to engage the said slot for locking the joint in adjusted position, for the purpose specified.

4. A joint consisting of one member provided with pivot ears, with a slot transversely therethrough, and a second member pivoted between the said ears and having transverse dovetail notches; and a catch arranged in the slot of said first member and supported thereby, provided with a dovetail engaging portion to engage the said slot for locking the joint in adjusted position, for the purpose specified.

In witness whereof, I have hereunto set my hand and seal in the presence of two witnesses.

EDWARD T. REMISCH. [L. S.]

Witnesses:
LUELLA G. GREENFIELD,
F. GERTRUDE TALLMAN.